(12) United States Patent
Johnson et al.

(10) Patent No.: US 8,596,682 B2
(45) Date of Patent: Dec. 3, 2013

(54) VEHICLE LOAD MOUNTING SYSTEMS AND METHODS OF SECURING LOADS

(75) Inventors: Erik Johnson, Snoqualmie, WA (US); Chris Gross, North Bend, WA (US); Jeff Schlutt, Covington, WA (US); Josh Engstrom, Woodinville, WA (US)

(73) Assignee: PACCAR Inc, Bellevue, WA (US)

( * ) Notice: Subject to any disclaimer, the term of this patent is extended or adjusted under 35 U.S.C. 154(b) by 391 days.

(21) Appl. No.: 12/475,140

(22) Filed: May 29, 2009

(65) Prior Publication Data

US 2010/0301084 A1    Dec. 2, 2010

(51) Int. Cl.
*B60R 9/02* (2006.01)
*B60K 15/067* (2006.01)

(52) U.S. Cl.
USPC ............... 280/769; 280/834; 180/69.4

(58) Field of Classification Search
USPC .......... 280/762, 769, 834; 180/68.5, 69.4
See application file for complete search history.

(56) References Cited

U.S. PATENT DOCUMENTS

| | | | | |
|---|---|---|---|---|
| 1,218,056 | A | * | 3/1917 | Cole ............... 180/68.5 |
| 1,465,660 | A | * | 8/1923 | Alborn ........... 180/68.5 |
| 1,658,923 | A | * | 2/1928 | Heiney ........... 280/834 |
| 1,797,873 | A | | 3/1931 | McManus |
| 2,065,268 | A | | 12/1936 | Crary |
| 2,402,682 | A | * | 6/1946 | Shriro et al. ........ 248/505 |
| 2,622,887 | A | | 12/1952 | Prior |
| 2,902,240 | A | | 9/1959 | La Belle |
| 4,013,300 | A | | 3/1977 | Berger |
| D244,255 | S | | 5/1977 | Snyder |
| 4,102,432 | A | | 7/1978 | Bustin |
| 4,327,809 | A | * | 5/1982 | Fenstermaker ....... 180/68.5 |
| 4,357,027 | A | | 11/1982 | Zeitlow |
| 4,610,453 | A | | 9/1986 | Collier |
| 4,834,401 | A | | 5/1989 | Harrington |
| 4,925,235 | A | | 5/1990 | Fingerle |
| 4,936,409 | A | * | 6/1990 | Nix et al. ........... 180/68.5 |
| 5,054,799 | A | | 10/1991 | Fingerle |
| 5,366,246 | A | * | 11/1994 | Chen et al. ......... 280/834 |
| 5,634,665 | A | * | 6/1997 | Jung ................ 280/834 |
| D381,949 | S | | 8/1997 | Barrett, Jr. |
| 6,029,989 | A | | 2/2000 | Stuart |
| 6,053,533 | A | | 4/2000 | Osborn |
| 6,076,844 | A | | 6/2000 | Stuart |
| 6,099,007 | A | | 8/2000 | Stuart |
| 6,152,470 | A | | 11/2000 | Stuart |
| 6,347,678 | B1 | | 2/2002 | Osborn |
| 6,378,823 | B1 | | 4/2002 | Edholm |
| 6,886,861 | B2 | | 5/2005 | Marsala |
| 7,258,366 | B2 | | 8/2007 | Yingling |
| 2007/0108718 | A1 | | 5/2007 | Ruehl |

\* cited by examiner

FOREIGN PATENT DOCUMENTS

JP    11-310043 A    11/1999
WO    2007/133213 A1    11/2007

*Primary Examiner* — Frank Vanaman
(74) *Attorney, Agent, or Firm* — Christensen O'Connor Johnson Kindness PLLC

(57) ABSTRACT

A load mounting system for a vehicle generally includes a support assembly configured for supporting a load, wherein the support assembly has a first end and a second end, the first end being mountable to a frame of a vehicle at one or more support assembly mounting locations along the frame. The system further includes at least one retaining device configured for securing the load on the support assembly, the at least one retaining device being coupleable to the first and second ends of the support assembly, wherein the at least one retaining device is coupleable to the first end of the support assembly at a different location than the support assembly mounting locations along the frame.

8 Claims, 4 Drawing Sheets

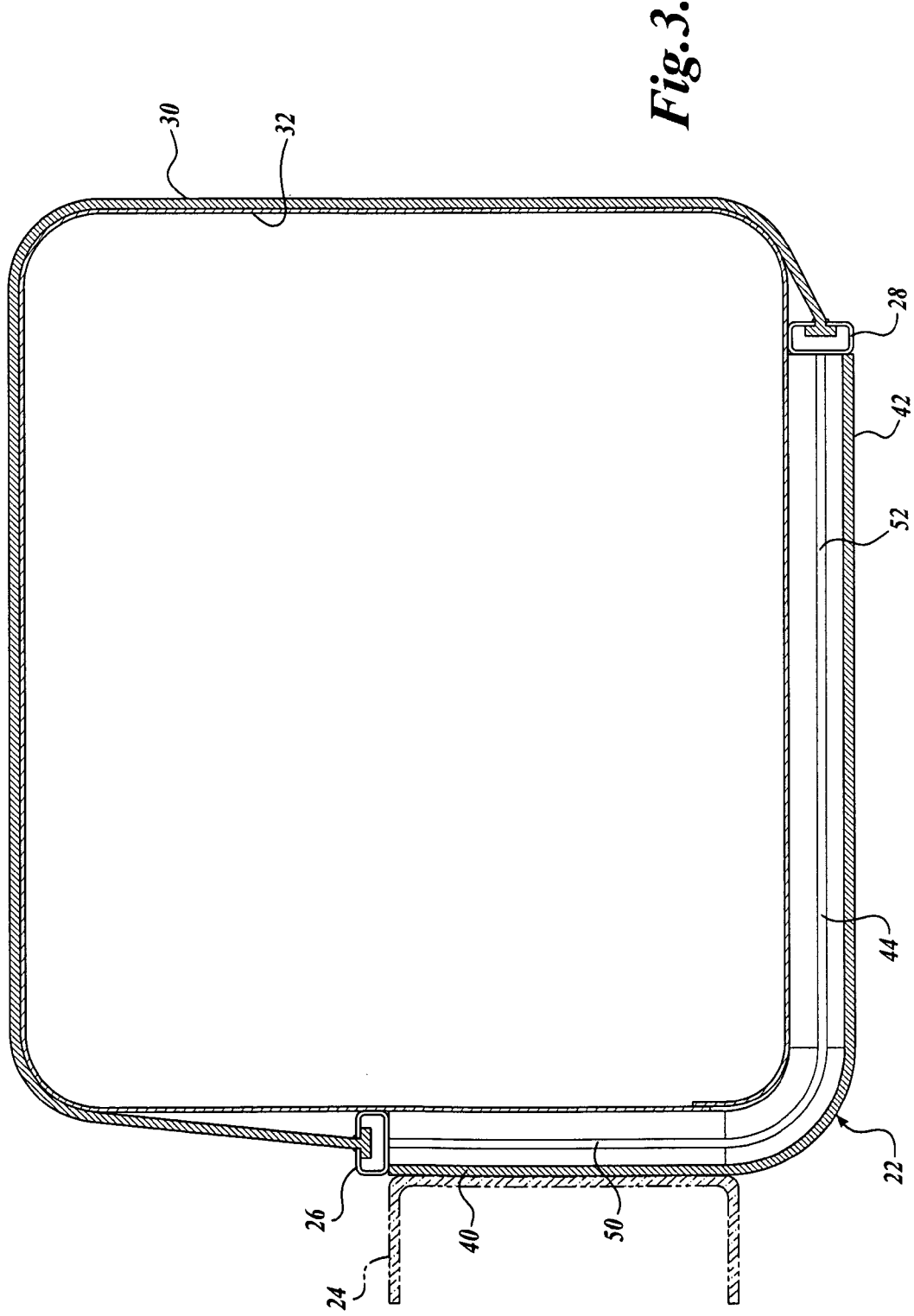

VEHICLE LOAD MOUNTING SYSTEMS AND METHODS OF SECURING LOADS

BACKGROUND

Commercial vehicles are generally made to order, each having a custom chassis mounting design for mounted components, such as the battery box, tool box, fuel tanks, exhaust system, and hydraulic components. In order to simplify the custom design process, there exists a need for a fuel tank mounting system that is locatable in a plurality of positions along the chassis, while still providing proper support for the mounted components.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with another embodiment of the present disclosure, a load mounting system for a vehicle is provided. The system generally includes a support assembly configured for supporting a load, wherein the support assembly has a first end and a second end, the first end being mountable to a frame of a vehicle at one or more support assembly mounting locations along the frame. The system further includes at least one retaining device configured for securing the load on the support assembly, the at least one retaining device being coupleable to the first and second ends of the support assembly, wherein the at least one retaining device is coupleable to the first end of the support assembly at a different location than the support assembly mounting locations along the frame.

In accordance with another embodiment of the present disclosure, a load mounting system for a vehicle is provided. The system generally includes a support component configured for supporting a load, the support component being mountable to a frame of a vehicle in a plurality of locations along the frame. The system further includes a first attachment member coupleable to the first and second support components at respective first and second attachment positions, and a second attachment member coupleable to the first and second support components at respective third and fourth attachment positions. The system further includes at least one retaining device configured for securing the load on the support brackets, the at least one retaining device being coupleable to the first and second attachment members at locations along the first and second attachment members different from at least two of the first, second, third, and fourth attachment positions.

In accordance with another embodiment of the present disclosure, a method of securing a load on a vehicle frame is provided. The method generally includes attaching a load mounting system to the vehicle frame, the system including a support assembly configured for supporting the load, wherein the support assembly has a first end and a second end, the first end being mountable to a frame of a vehicle at one or more support assembly mounting locations along the frame, and further including at least one retaining device configured for securing the load on the support assembly, the at least one retaining device being coupleable to the first and second ends of the support assembly, wherein the at least one retaining device is coupleable to the first end of the support assembly at a different location than the support assembly mounting locations along the frame. The method further includes placing a load on the support assembly and securing the load on the support assembly by coupling the at least one retaining device to the first and second ends of the support assembly.

DESCRIPTION OF THE DRAWINGS

The foregoing aspects and many of the attendant advantages of this disclosure will become more readily appreciated by reference to the following detailed description, when taken in conjunction with the accompanying drawings, wherein:

FIG. 3 is a cross-sectional side view of the mounting system of FIG. 1, wherein the tank is shown mounted by the mounting system to the vehicle chassis.

DETAILED DESCRIPTION

Figure 1:
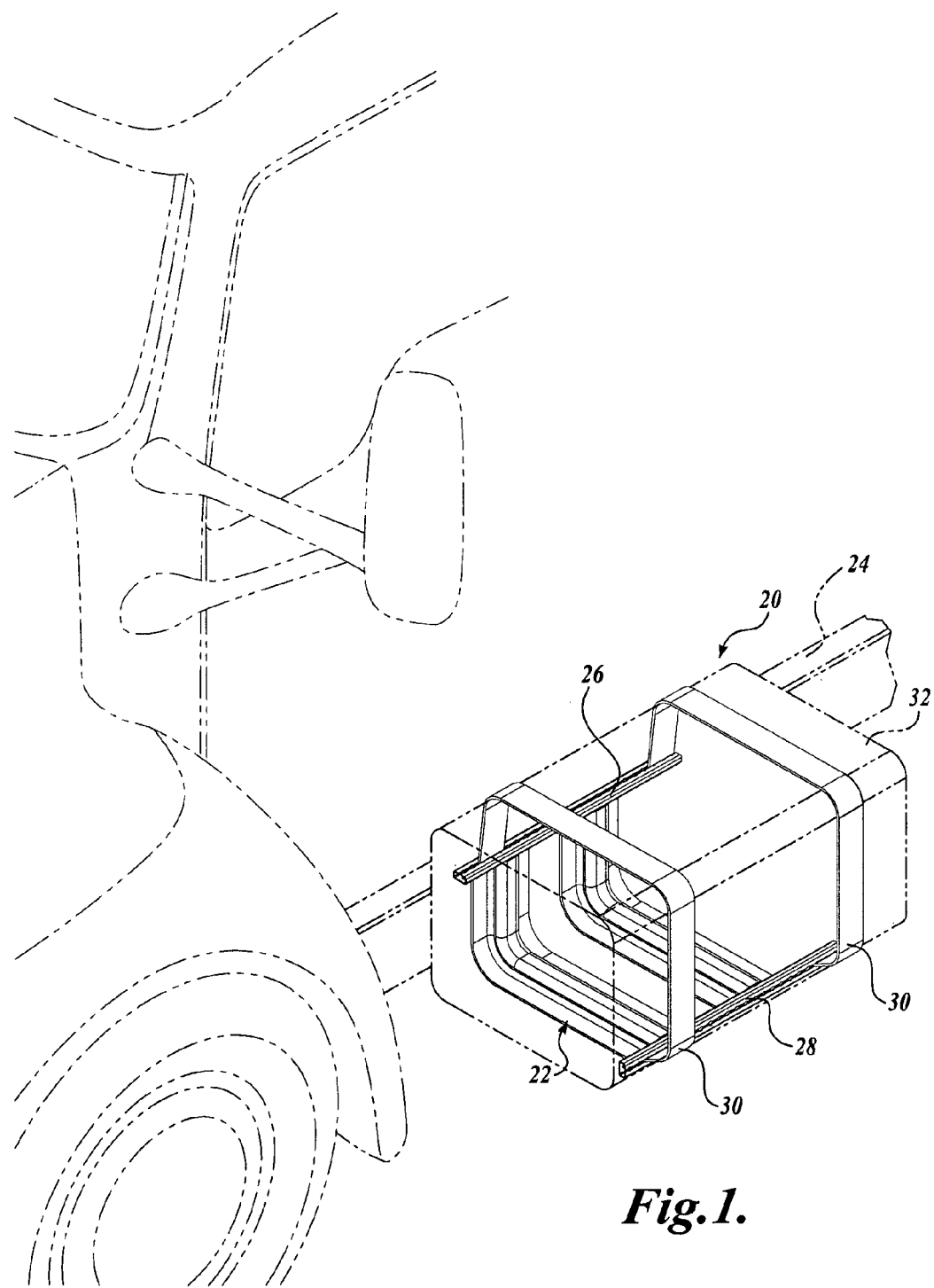
FIG. 1 is a perspective view of a mounting system for mounting a tank to a vehicle chassis constructed in accordance with one embodiment of the present disclosure, wherein the tank is shown mounted by the mounting system to the vehicle chassis.

Embodiments of the present disclosure are generally directed to mounting systems for mounting a load to a vehicle chassis. Referring to FIGS. 1-4, there is shown a mounting system 20 constructed in accordance with one embodiment of the present disclosure. The mounting system 20 generally includes a support assembly 22 that is coupleable to the frame or chassis 24 of the vehicle (see FIG. 1). The support assembly 22 is configured such that one or more retaining devices 30 can be attached, for example, to attachment members 26 and 28 on the support assembly 22, to secure a mountable component or load 32, such as a tank, to the vehicle frame 24.

The mounting system 20 can be mounted at any suitable location along the frame 24 to provide support for a mountable component or load 32. As described in greater detail below, the one or more retaining devices 30 are positionable along the attachment members 26 and 28 at a plurality of locations independent of the positioning of the support assembly 22 on the frame 24. Therefore, embodiments of the disclosure are directed to tank mounting systems that have at least two adjustable components to accommodate custom frame mounting designs: (1) the positioning of the support assembly 22 on the frame 24 and (2) the positioning of the one or more retaining devices 30 on the attachment members 26 and 28.

Such adjustability allows for consistent placement of the retaining devices 30 on the mountable component 32 (e.g., a tank) to provide proper securement and support for the mountable component 32, regardless of the location of the mountable component 32 relative to the vehicle frame 24. For example, some tanks include grooves for retaining devices 30 to rest. Such adjustability also reduces, for example, tank layouts, frame layouts, part counts, and assembly time, and improves tank aesthetics. Although shown as a tank in the illustrated embodiment, the mountable component 32 may be any component or load, including but not limited to one or more fuel tanks, battery boxes, tool boxes, exhaust systems, hydraulic components, etc. In addition, other components, for example, cab steps (not shown), may be attached to the support assembly 22 and/or the retaining devices 30. The adjustability of the system 20 therefore allows for suitable placement of these components relative to the frame 24 of the vehicle.

Figure 2:
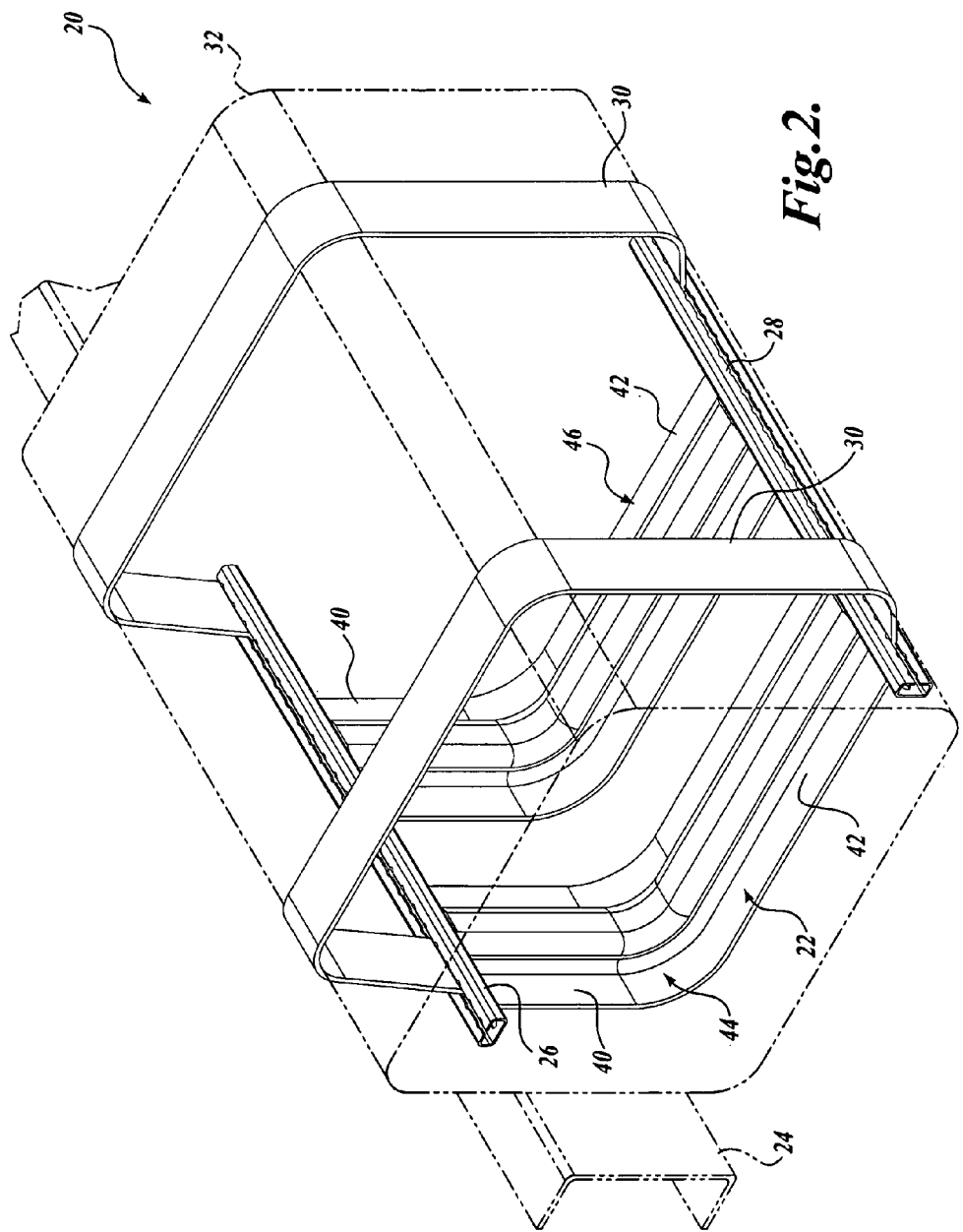
FIG. 2 is a close-up perspective view of the mounting system of FIG. 1.

Referring to FIGS. 2 and 3, the support assembly 22 will now be described in greater detail. The support assembly 22 is shown in the illustrated embodiment as two support components 44 and 46 generally configured to provide support for a mountable component 32, such as a tank. However, it should be appreciated that the support assembly 22 may include one support component or more than two support components. The support assembly 22 is coupleable or mountable to the frame 24 of the vehicle. It should be appreciated that the support assembly 22 may be removably coupled to the frame 24 by removable means, such as fasteners, or permanently coupled to the frame 24 by more permanent means, such as by welding and/or adhesive.

When mounted, the support assembly 22 extends outwardly from the frame 24 of the vehicle in the illustrated embodiment. In that regard, the support assembly 22 includes first and second ends 40 and 42, wherein the first end 40 is proximate the vehicle frame 24 and the second end 42 is distal from the vehicle frame 24. In a preferable embodiment, the support assembly 22 allows a mountable component 32, such as a tank, to be mounted on the support assembly 22 in a resting position before being secured. In this manner, an operator can mount the tank 32 in a resting position for ease in securing the tank 32 to the support assembly 22 using one or more retaining devices 30, as described in greater detail below. Depending on the mountable component, it should be appreciated that the support assembly 22 need not extend outwardly from the frame 24 of the vehicle, but may extend inwardly, for example, under the frame 24 of the vehicle, upwardly or downwardly, or any suitable combination thereof.

In the illustrated embodiment, the support assembly 22 includes first and second support components 44 and 46, which are substantially L-shaped support bars, each having a vertical component 50 and a horizontal component 52 (see FIG. 3). The vertical component 50 provides a back resting surface for the tank 32, while the horizontal component 52 provides a bottom resting surface for the tank 32, so as to properly position the tank 32 adjacent the frame 24 prior to securing it in place. As mentioned above, although shown as including two support components 44 and 46 in the illustrated embodiment, it should be appreciated that any number of support components are within the scope of the present disclosure.

It should be appreciated that other configurations that allow a mountable component or load to rest without substantial movement prior to securement are also within the scope of the present disclosure. For example, the support components may be designed to conform to various shapes and sizes of mountable components, including but not limited to substantially cylindrical, substantially rectangular, and other polygonal cross-section mountable components. As non-limiting examples, the support components may be configured in substantially V-shaped or substantially U-shaped configurations, or in a substantially C-shaped configuration. Moreover, the support components may include a flat platform, a molded dish designed to correspond with the shape of the mountable component or load, a plurality of supports or support bars (e.g., more than two), a grill, a frame, a net on a frame, any combination thereof, or any other suitable support component to provide adequate support for a mountable component or load.

As seen in the illustrated embodiment, the support assembly 22 may include first and second attachment members 26 and 28, which will now be described in greater detail. The first attachment member 26 is located at the first end 40 of the support assembly 22, and the second attachment member 28 is located at the second end 42 of the support assembly 22. Although shown in the illustrated embodiment as discrete elements for full adjustability, it should be appreciated that the support components 44 and 46 and attachment members 26 and 28 may be integrated into the support assembly 22.

In the illustrated embodiment, the first and second attachment members 26 and 28 are substantially bar or rail members that extend substantially perpendicular to the orientation of the support components 44 and 46. The first attachment member 26 is affixed adjacent the frame 24 in a substantially parallel orientation to the frame 24. The second attachment member 28 is attached at the second distal end 42 of the support components 44 and 46 and is in a substantially parallel orientation to the frame 24. It should be appreciated that the first and second attachment members may also be plates, tubes, chains, or any other suitable attachment member.

The attachment members 26 and 28 may provide for adjustable attachment of the support assembly 22 to the vehicle frame 24, as well as adjustable attachment of the one or more retaining devices 30 to the support assembly 22. In that regard, the first and second attachment members 26 and 28 may be coupled to the support components 44 and 46 at any locations along the lengths of the first and second attachment members 26 and 28. Moreover, the retaining devices 30 may be coupled to the first and second attachment members 26 and 28 at any locations along the lengths of the first and second attachment members 26 and 28. The location of attachment along the attachment members 26 and 28 of a support component 44 or 46 may coincide or be different than the location of attachment for a retaining device 30. In that regard, the system 20 is adaptable to fit various unique vehicle chassis design. For example, as best seen in FIG. 2, the retaining devices 30 are attached at the ends of the first and second attachment members 26 and 28, while one support component 44 is attached at the left end of the first and second attachment members 26 and 28 and the other support component 46 is attached at the center of the first and second attachment members 26 and 28.

As seen in the illustrated embodiment, the support assembly 22 is coupled to the vehicle frame 24 along a vertical component 50 of the support assembly 22. Such attachment allows for a reinforced attachment of the support assembly 22 to the frame 24 because there may be multiple points of attachment along the vertical component 50 to the frame 24. The points of attachment may be adjustable, for example, by removal fasteners, which may be dependent upon the custom options or design of the vehicle and whether adjustability is required in the vehicle design. Alternatively, the points of attachment may be permanent, for example, by welding and/or adhesive. In other non-limiting embodiments, the support assembly 22 may be attached to the frame vehicle along a horizontal component 52 of the support assembly 22 or by an attachment member, for example, the first or second attachment members 26 or 28.

Also seen in the illustrated embodiment, the second attachment member 28 is coupled to the second end 42 of the support assembly 22. The second attachment member 28 provides an attachment mechanism for one or more retaining devices 30. In that regard, at least one retaining device 30 is configured for securing the mountable component 32 on the support assembly 22, with the at least one retaining device 30 being coupleable to the first and second ends 40 and 42 of the support assembly 22. Notably, at least one retaining device 30 is coupleable to the first end 40 of the support assembly 22 at a different location than the support assembly mounting locations along the frame 24. In addition, two or more retaining devices 30 may be coupleable to the first end of the support assembly 22 at different locations than the support assembly 22 mounting location along the frame 24.

The retaining devices 30 may be flexible or inflexible straps, cables, tie-downs, bands, chains, or other devices capable of securing a load. The retaining devices 30 may be fixedly or releasably coupled to either or both of the first and second attachment members 26 and 28 at a plurality of locations along the first and second attachment members 26 and 28, as seen in FIG. 2. In other embodiments, the retaining devices 30 may be fixedly coupled to the frame 24 or the first attachment member 26 and the frame 24. It should be appreciated that a releasable coupling at either the first or second end 40 or 42 of the support assembly 22 allows for quick release of the mountable component 32 from the support assembly 22.

Figure 4A:
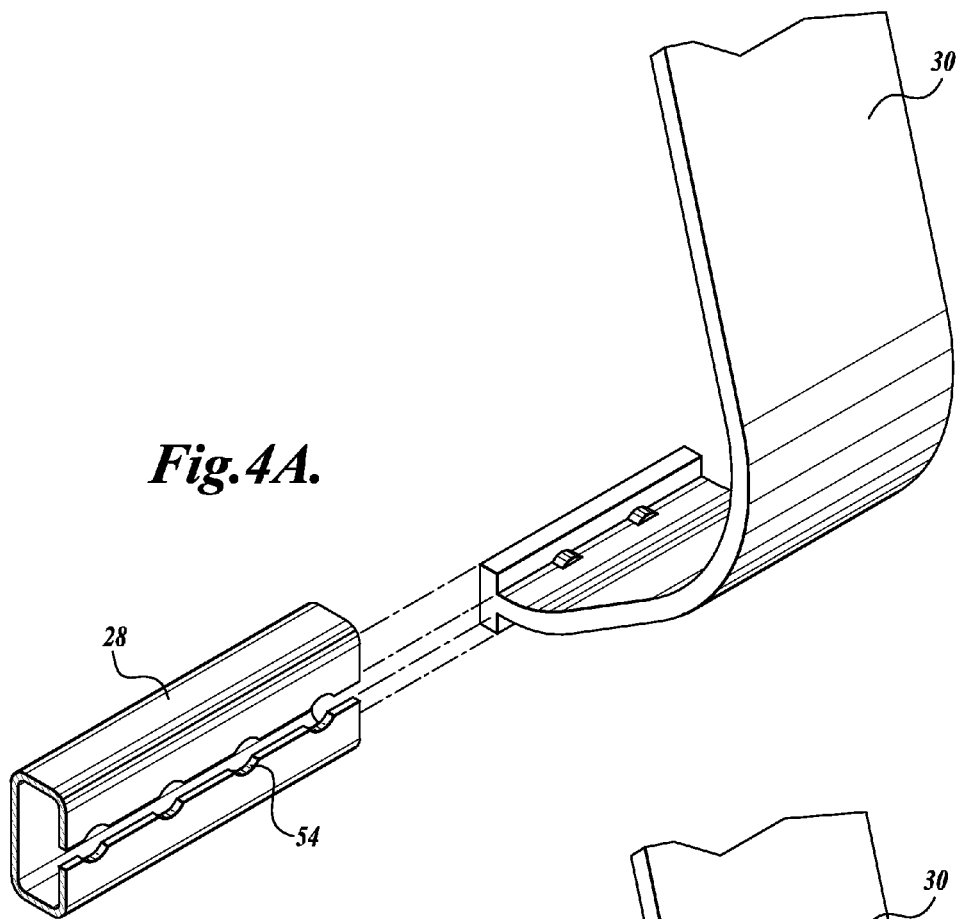
FIGS. 4A and 4B are perspective views of an interface for the mounting system in disengaged and engaged configurations, respectively.
Figure 4B:
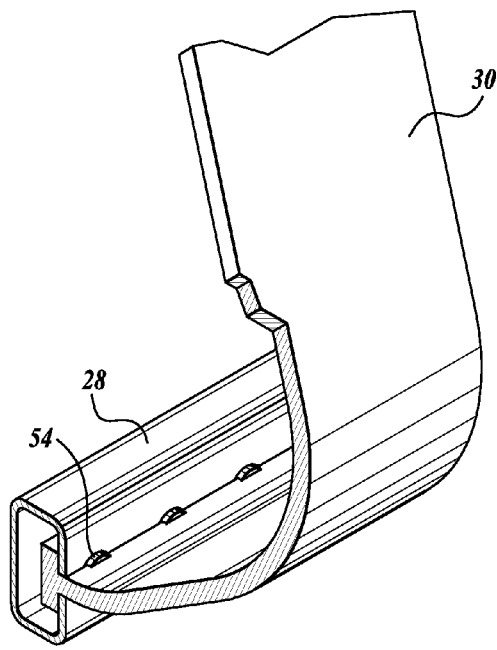

Referring now to FIGS. 4A and 4B, the second attachment member 28 may include a plurality of strap attachment holes or slots 54 for selective and releasable attachment of a retaining device 30 at any location along the second attachment member 28. In that regard, the retaining device 30 may be slidably received within the attachment slot 54 and can be positioned at various positions along the length of the attachment slot 54.

It should be appreciated that the retaining devices 30 may be attached to the attachment tracks 26 and 28 by any suitable attachment method, including but not limited to sliding attachment (see FIGS. 4A and 4B), bolted or fastener attachment (not shown), and turn buckle attachment (not shown). It should further be appreciated that the turn buckle attachment allows for straps of different sized widths to be used with the strap attachment track.

While illustrative embodiments have been illustrated and described, it will be appreciated that various changes can be made therein without departing from the spirit and scope of the disclosure.

The invention claimed is:

1. A load mounting system for a vehicle, including:
  (a) a support assembly configured for supporting a load, wherein the support assembly has a substantially vertical component having first and second ends and defining an inner substantially vertical plane and a substantially horizontal component having first and second ends and defining an inner substantially horizontal plane, wherein the first end of the substantially vertical component is connected with the first end of the substantially horizontal component, at least a portion of the substantially vertical component being mountable to a frame of a vehicle at one or more support assembly mounting locations along the longitudinal axis of the frame and, when mounted, the substantially horizontal component is configured to extend from the frame of the vehicle for supporting a load, such that the load has positive contact with at least a portion of the inner substantially vertical plane and at least a portion of the inner substantially horizontal plane;
  (b) first and second attachment members extending along at least a portion of the respective second ends of the substantially vertical component and the substantially horizontal component, wherein the second attachment member is positioned at or below the substantially horizontal plane, wherein the first and second attachment members each include an elongate slot; and
  (c) at least one retaining device configured for securing the load on the support assembly, the at least one retaining device being coupleable to the first and second attachment members, wherein the at least one retaining device is movable from a first coupling position to the first and second attachment members to a second coupling position to the first and second attachment members, and wherein the at least one retaining device is coupleable to the first and second attachment members at a different axis location than the support assembly mounting locations along the longitudinal axis of the frame, wherein the at least one retaining device is slidably movable within the elongate slots of the first and second attachment members.

2. The system of claim 1, wherein the support assembly is configured in a design selected from the group consisting of substantially L-shaped, substantially C-shaped, and substantially U-shaped.

3. The system of claim 1, wherein the first and second attachment members are substantially parallel to the frame of the vehicle.

4. A load mounting system for a vehicle, including:
  (a) a support component configured for supporting a load, the support component being mountable to a frame of a vehicle in a plurality of locations along the longitudinal axis of the frame, wherein the support component defines a substantially horizontal plane that, when mounted, extends outwardly from the frame of the vehicle for supporting a load, such that the load nests along at least a portion of the substantially horizontal plane, wherein the support component includes at least first, second, third, and fourth support component attachment positions;
  (b) a first attachment member coupleable to the first and second support component attachment positions located at the distal end of the substantially horizontal component such that the first attachment member is positioned at or below the substantially horizontal plane, and a second attachment member coupleable to the third and fourth support component attachment positions, wherein the first and second attachment members each include an elongate slot; and
  (c) at least one retaining device configured for securing the load on the support component, the at least one retaining device being coupleable to the first and second attachment members at axis locations along the first and second attachment members different from at least two of the axis locations of the first, second, third, and fourth attachment positions, wherein the at least one retaining device is slidably movable within the elongate slots of the first and second attachment members.

5. A method of securing a load on a vehicle frame, the method comprising:
  (a) attaching a load mounting system to the vehicle frame, the system including:
    (i) a support assembly configured for supporting the load, wherein the support assembly has a first substantially vertical component and a second substantially horizontal component defining a substantially horizontal plane, at least a portion of the substantially vertical component being mountable to a frame of a vehicle at one or more support assembly mounting locations along the longitudinal axis of the frame, wherein, when the support assembly is mounted, the substantially horizontal component extends outwardly from the frame;
    (ii) first and second attachment members attached to the substantially vertical component and the substantially horizontal component, wherein the second attachment member is located at the distal end of the substantially horizontal component such that the first attachment member is positioned at or below the substantially horizontal component, wherein the first and second attachment members each include an elongate slot; and (iii) at least one retaining device configured for securing the load on the support assembly, the at least one retaining device being adjustably coupleable to the first and second attachment members, wherein the at least one retaining device is coupleable to the first and second attachment members at a different axis location than the support assembly mounting locations along the longitudinal axis of the frame, wherein the at least one retaining device is slidably movable within the elongate slots of the first and second attachment members;

(b) placing a load on the support assembly, such that the load nests along at least a portion of the substantially horizontal plane;

(c) moving the at least one retaining device from a first coupling position to the first and second attachment members to a second coupling position to the first and second attachment members; and (d) securing the load on the support assembly by coupling the at least one retaining device to the second coupling position.

6. The method of claim 5, the method further comprising moving the at least one retaining device from a first coupling position to the first and second attachment members to a second coupling position to the first and second attachment members.

7. The method of claim 5, wherein the support assembly is configured in a design selected from the group consisting of substantially L-shaped, substantially C-shaped, substantially U-shaped, and substantially V-shaped.

8. The method of claim 5, further comprising slidably moving the at least one retaining device from a first coupling position to the first and second attachment members to a second coupling position to the first and second attachment members.

* * * * *